Figure 5:
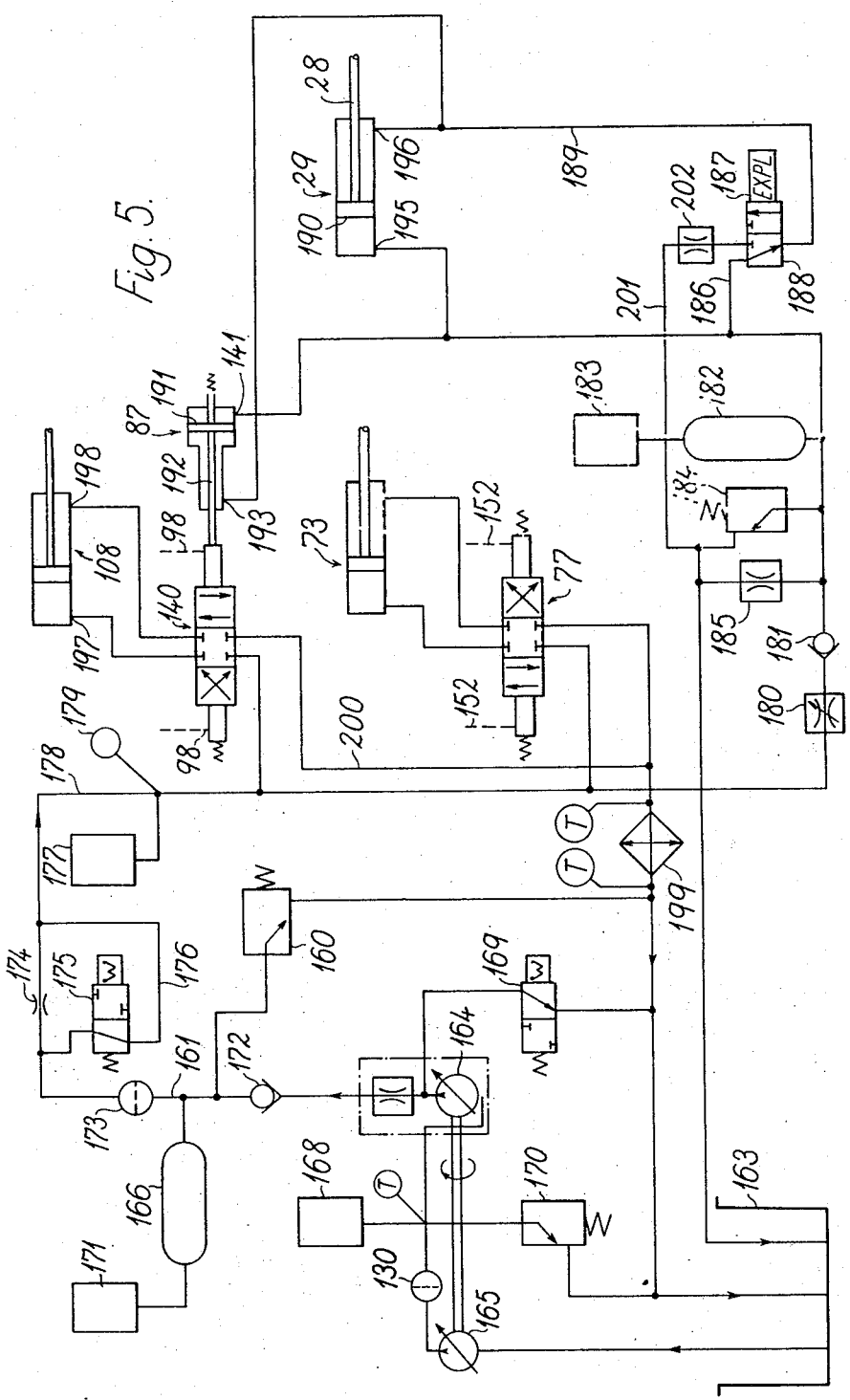

United States Patent [19]
English et al.

[11] 3,800,708
[45] Apr. 2, 1974

[54] TRACKED VEHICLE AND SUSPENSION SYSTEM

[75] Inventors: Christopher Durrant English, Burwell; Brian Robert Fuller, Duxford; Geoffrey Edward Bone, Crookham; Peter Douglas Bishop, Wokingham; Eric James Birchnall, Bracknell, all of England

[73] Assignee: Tracked Hovercraft Limited, London, England

[22] Filed: Oct. 18, 1972

[21] Appl. No.: 298,532

[30] Foreign Application Priority Data
Oct. 20, 1971   Great Britain.................. 48858/71

[52] U.S. Cl. ........................................ 104/148 LM
[51] Int. Cl. ............................................. B60l 13/00
[58] Field of Search ......... 104/148 LM; 191/66, 67, 191/68, 69, 56

[56] References Cited
UNITED STATES PATENTS

| | | | |
|---|---|---|---|
| 3,514,553 | 5/1970 | Penney, Jr. et al................. | 191/56 |
| 3,349,197 | 10/1967 | Scheidecker......................... | 191/67 |
| 3,385,228 | 5/1968 | Chung.......................... | 104/148 LM |

*Primary Examiner*—Robert G. Sheridan
*Assistant Examiner*—George H. Libman
*Attorney, Agent, or Firm*—Gordon W. Daisley

[57] ABSTRACT

In a vehicle propelled by a linear induction motor along a prepared track in which the stator of the motor is carried by the vehicle for co-operation with a reaction rail extending along the track, the stator is connected to the vehicle body by pairs of hydraulic rams arranged to act in parallel. One ram of each pair is arranged to exert a substantially constant force on the stator and the other ram of each pair is servo controlled to act with or against the constant force ram to maintain a predetermined operating gap between the stator and the reaction rail. The constant force is preferably equal to a suitably chosen mean value of the load exerted by the stator due to its weight plus or minus electro-magnetic forces exerted thereon. The servo controlled rams are preferably arranged to exert a force substantially equal to the difference between the constant force and the instantaneous value of a variable force required to be applied to the stator to maintain its desired position. Actuators other than rams may be employed and they may be arranged to control the position of structure other than linear induction motor stators associated with the vehicle, for example, bogies.

9 Claims, 8 Drawing Figures

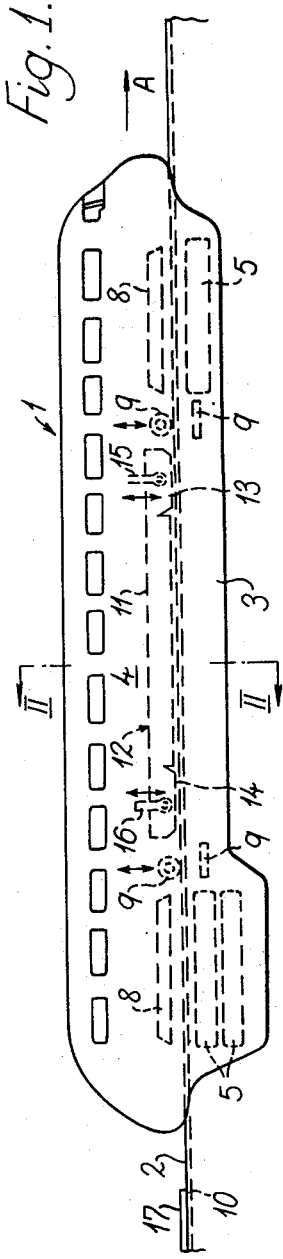
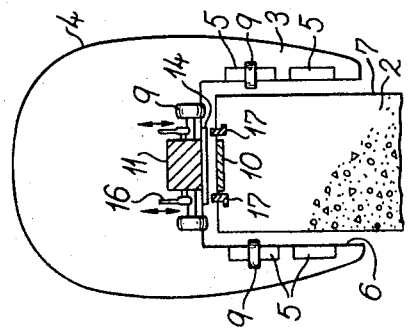

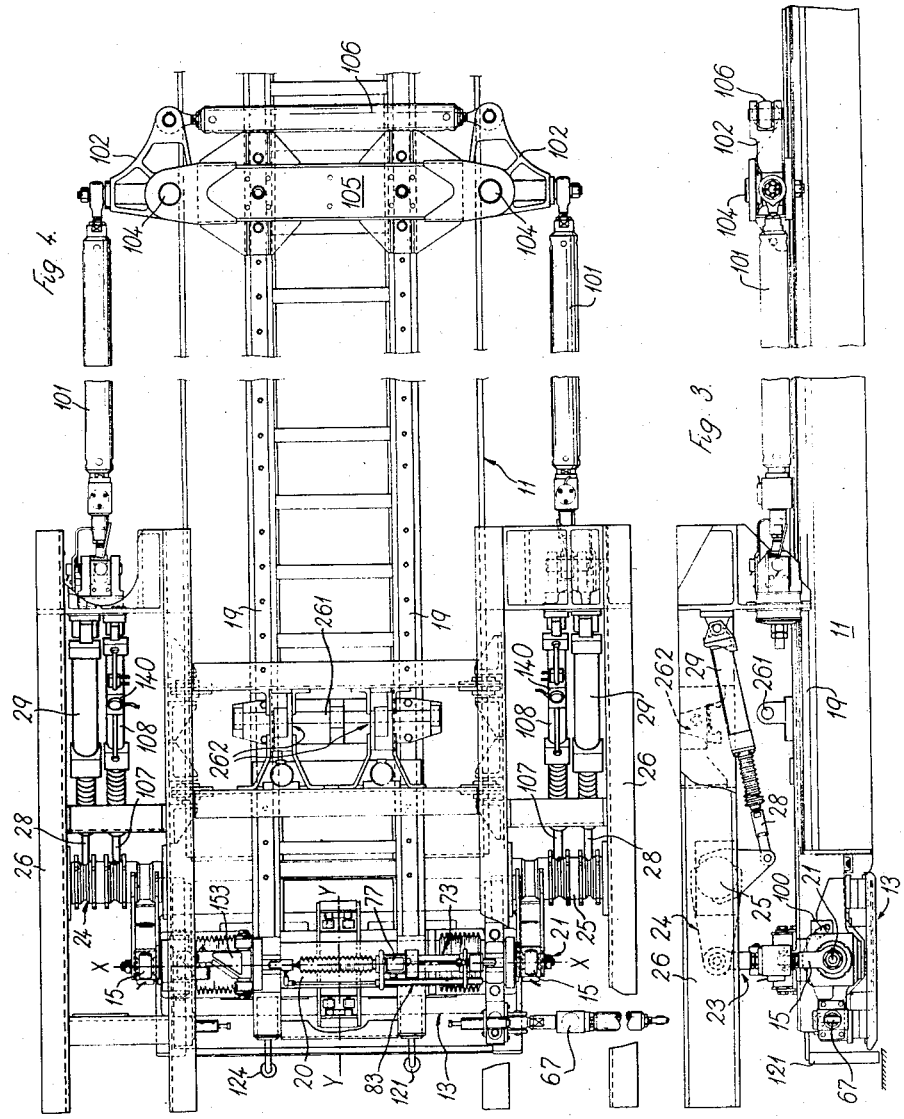

TRACKED VEHICLE AND SUSPENSION SYSTEM

This invention concerns vehicles adapted for operation along a prepared track and relates to suspension systems for attaching to the body of such a vehicle a structure which co-operates with the track. The co-operation may be for the purpose of vehicle support or guidance, or it may be for the purpose of vehicle propulsion, the structure then comprising a linear induction motor primary member or "stator" which for operation is energised from an a.c. supply so as to co-operate electromagnetically with a linear induction motor secondary member or "rotor" extending along the track.

In accordance with the present invention a vehicle for operation along a prepared track has a vehicle body and an associated structue for co-operation with the track, and at least one pair of actuators connected operatively in parallel between the vehicle body and the structure, means for energizing a first of said actuators to produce a substantially constant force between the said structure and the vehicle body, the said force being equal to selected mean value of a variable force required to be transmitted between the vehicle body and the said structure during operation of the vehicle, and means for selectively energising a second of said actuators to produce, during operation of the vehicle, a controllable force substantially equal to the difference between the said constant force and the actual value of the said variable force.

Preferably, as in the described embodiment, the actuators are connected at one end to the first arm of a crank pivotally mounted on the vehicle body, a second arm of the crank and the other ends of the actuators being connected one to the structure and the other to the vehicle body.

According to a preferred feature of the invention the actuators are double-acting hydraulic rams, both sides of one ram comprising the first actuator being supplied with hydraulic fluid at substantially the same pressure to produce the said constant force, the supply of hydraulic fluid to one or the other side of the other ram being controlled by a servo valve in response to signals indicating the sense and magnitude of the controllable force required.

When the said structure is a linear induction motor stator the pair of actuators form part of the support system by which the stator is supported from the vehicle body at a substantially constant spacing from the co-operating rotor. With such an arrangement there sometimes occurs the danger that the stator will impact the track when the vehicle is travelling at speed, with consequent damage to rotor and/or stator. Preferably in an arrangement as described in the preceding paragraph there is provided an auxiliary actuator coupled to the servo valve, and having a piston which is normally subject to equal, fluid-generated forces on either side, and an emergency valve which is operable automatically in such an eventuality to vent the hydraulic fluid on one side of each of the first actuator and the auxiliary actuator, the auxiliary actuator being thereby effective to operate the servo valve so as to vent the hydralic fluid on one side of the second actuator, and to supply fluid to the other side thereof so that the actuators act in unison to move the linear induction motor stator quickly away from the rotor.

Figure 6:
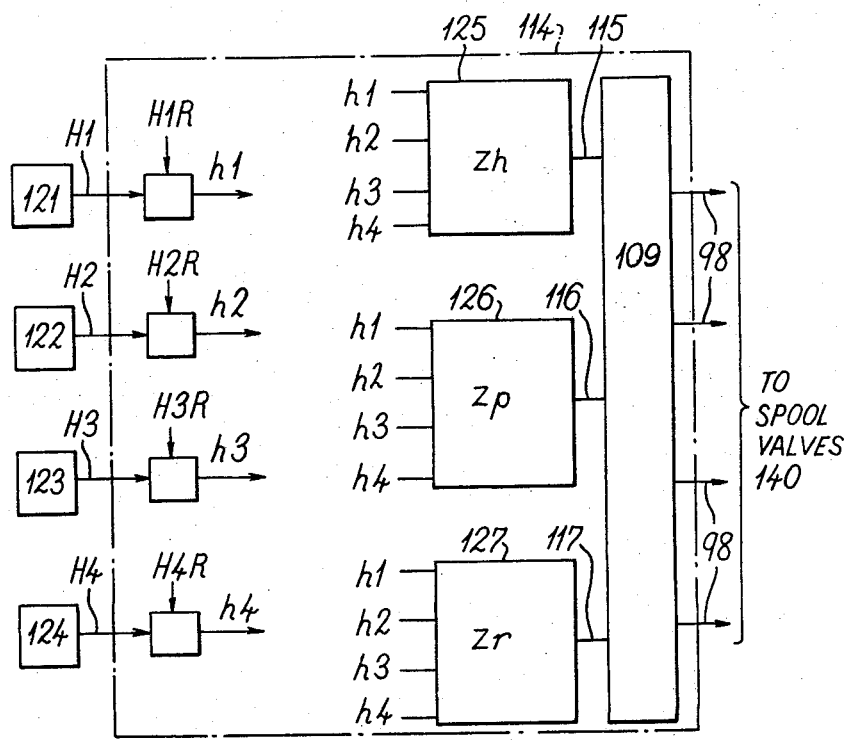
Figure 7:
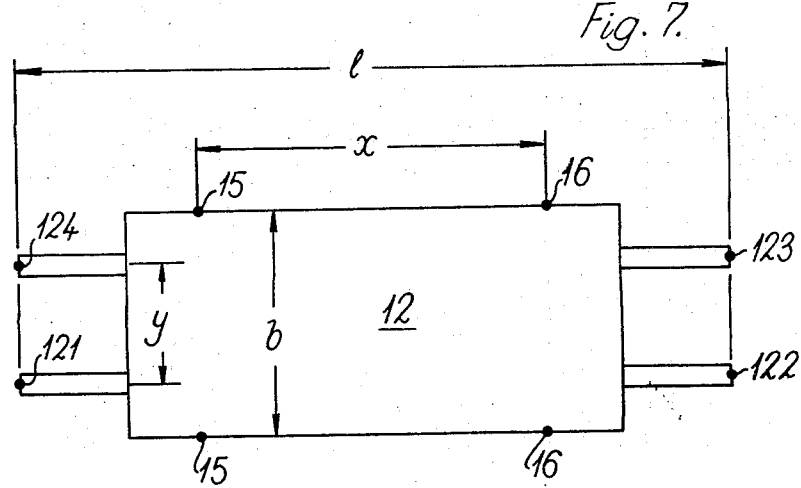
Figure 8:
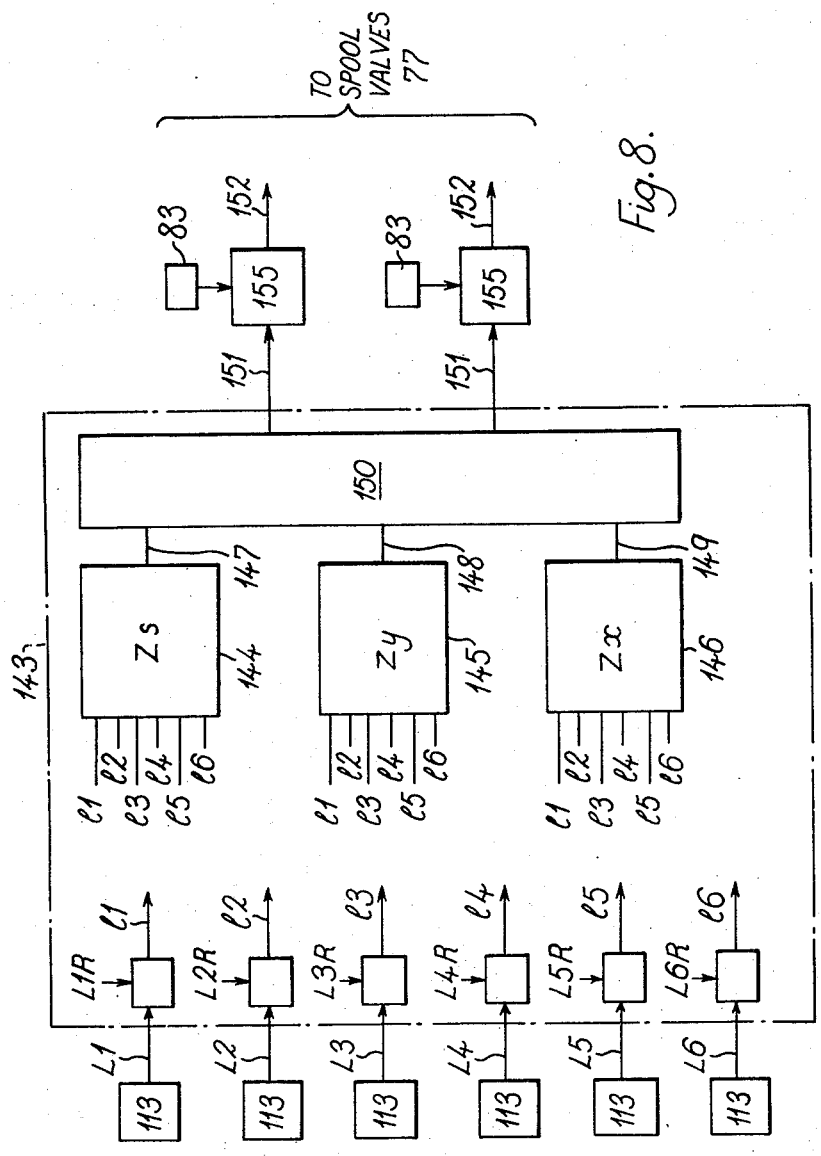

These and other aspects and features of the present invention will now become apparent from the following description, given by way of example and with reference to the accompanying drawings, of one embodiment of the invention. In the drawings:

FIG. 1 is a diagrammatic side elevation of an air cushion vehicle arranged for operation along a prepared track, FIG. 2 is a diagrammatic transverse section on the line II—II of FIG. 1, FIG. 3 shows in side elevation the front propulsion unit provided for driving the vehicle along the track, FIG. 4 is the plan view corresponding to FIG. 3, FIG. 5 shows the hydraulic supply and control circuit for the actuators which effect the position and attitude control of the propulsion unit relative to the vehicle body, FIG. 6 is a schematic diagram of the electric control cicuit for the actuators providing control of the vertical position and attitude of the propulsion unit, FIG. 7 is a diagrammatic representation of the propulsion unit in plan view, indicating the relative positions of various components as required by the description relating to FIG. 6, and FIG. 8 is a schematic diagram of the electric control circuit for the actuators providing control of the lateral position and horizontal attitude of the propulsion unit.

The gas cushion vehicle 1 of FIGS. 1 and 2 is arranged for operation along a generally concrete prepared track 2 in the direction of the arrow A. Flanges 3 depend from the side walls 4 of the vehicle below the level of the top of the track, which is thus straddled by the vehicle. Three pairs of opposed gas cushion pads 5 of known kind are mounted on the inner faces 6 of flanges 3 by secondary suspensions represented by springs (not shown), and these pads co-operate with the vertical side wall 7 of track 2 by means of cushions of pressurized gas which they form and maintain to control the lateral position of the vehicle on the track and also its yaw and roll attitudes; of the three pairs of pads 5 two are mounted aft of the midpoint of the vehicle one beneath the other, and the third is mounted foward of the vehicle midpoint.

Gas cushion pads 8 similar to the pads 5 and mounted by secondary suspensions (not shown) carried on the underside of the vehicle 1 likewise co-operate with the horizontal top surface of track 2 to support the vehicle on the track and also control its movements in pitch and heave. Also provided are emergency devices in the form of retractable wheels 9 for controlling the lateral and/or vertical position of the vehicle should one or more of the gas cushion pads become inoperative and for vehicle handling.

The vehicle is propelled along the track by a linear induction motor the secondary member or rotor 10 of which is embedded in the top of track 2 and the primary member or stator 11 of which is suspended beneath the underside of vehicle 1. Stator 11 is part of a unit 12 comprising not only the stator but also two similar skids 13, 14 situated respectively fore and aft of the stator and lying with their bottom faces a little below that of the stator. Unit 12 is suspended from vehicle 1 by two vertical drop links 15 at its fore end and by two vertical drop links 16 at its aft end. Skids 13, 14 prevent direct contact between the rotor 10 and stator 11 should the emergency devices fail to work in the event of, for example, gas cushion failure. The skids are arranged to make contact with skid rails 17 mounted on the top of the track, but in a modification the skids 13, 14 are arranged for directly contacting the rotor 10.

FIGS. 3 and 4 are respectively a plan view and a side elevation showing the front end of the stator unit 12 with its skid 13 and drop links 15. Except for the exceptions later to become apparent, the unit 12 is symmetrical about its central transverse plane so that the following description, generally directed to the front end of the unit 12, is also applicable to the aft end with the drop links 16 substituted for the drop links 15 and with the skid 14 substituted for the skid 13.

Referring now to FIGS. 3 and 4, the skid 13 is mounted on a cross shaft 21 extending along a transverse axis X—X, by means of a pair of elastomeric bushes (not shown) each bonded on its outside to the skid and on its inside to the cross shaft. The cross shaft is prevented from rotational movement about its axis by an angular restraint linkage 153. An adjustable screw 100 carried by the skid abuts part of the linkage 153 and is adjustable to allow the skid to be set at a position in which its bottom face is approximately parallel to the underlying surface of the stator 11. In this position the elastomeric bushes are torsionally loaded; this torsional preloading substantially reduces oscillation of the skid when the skid is free of the track and the vehicle is operating at high speed. In the front skid 13 the co-operation between the adjustable screw 100 and the abutting surface is such as to restrain the skid against movement about the axis X—X in response to the backward frictional forces which are exerted on the skid when it contacts the track, although, by virtue of the mounting and dimensions of the skids 13, 14 such restraint is not needed; it will be appreciated, however, the screw 100 and associated surface will move part to allow 13 to conform to the track should the unit 12 contact the track in a nose-down attitude. In the aft skid 14 the screw 100 and cooperating surface are in the opposite sense to that of the skid 13 so that the skid 14 can confirm to the track when the unit 12 contacts the track in a tail-down attitude.

Although not apparent in the drawings the skid is articulated so that its bottom face is able to undergo a resisted rocking movement about a second, longitudinally directed, axis indicated in FIG. 4 by the line Y—Y. This rocking movement allows full contact between skid and track despite the unit 12 as a whole being in a rolled attitude relative to the track at the initial contact between them; in combination with the limited movement which is possible about the shaft 21 axis X—X it therefore ensures that once the initial misalignment has been corrected the skid 13 will operate in full contact with the track whatever the attitude of the unit 12.

Mounted on the cross shaft 21 for sliding movement therealong is a sleeve 20 of a shorter length than the cross shaft. Two spaced bearers 19 extend between the sleeve 20 and the corresponding sleeve at the aft end of the unit 12 so as with the two sleeves to form a rigid rectangular structure; to this structure at the bearers 19 is bolted the stator 11.

The two drop links 15 are gimballed on the ends of the cross shaft 21 and extend vertically upwardly to further gimballed or universal joints made to the output arms of respective cranks 24. The cransk 24 are rotatable about horizontal transverse axles 25 carried by a subframe 26 rigidly attached to the vehicle body and each have two input arms. For each crank 24 the input arms are individually connected in a pivotal manner to the operating rods 28, 107 of two double-acting and generally horizontally mounted hydraulic rams 29, 108 having their cylinders connected to the subframe 26 so as to operate in parallel with one another. Of the two rams associated with each crank 24 the outer ram 29 is hereinafter to be referred to as the "off-loading" ram; the inner ram 108 is hereinafter to be referred to as the "control" ram. The reason for this nomenclature will later become apparent.

The rams 29, 108 operate normally to maintain the unit 11 substantially parallel to the rotor 10 and at a constant small (e.g., 1 inch) spacing thereform, so that the propulsive thrust produced by the stator when energised from a three-phase a.c. supply is not affected to any substantial extend by heave, pitch and rolling movements of the vehicle body relative to the track.

A further function of the rams 29, 108 is under certain circumstances (as is later to be described) to lift the unit 12 away from the track so that two pairs of controllable latches carried on the underside of the vehicle body one pair forward and the other pair aft of the centre of gravity of the unit 12 can engage bars mounted on the top of the unit to releasably lock the stator in position; one of the pairs of latches and the associated bar are shown in FIGS. 3 and 4 and are respectively denoted by the reference numerals 262 and 261.

Such retraction and locking is performed either when it is merely required to take the weight of the unit 12 off the drop links 15, 16 such as for stowage or maintenance, or, more importantly, when there is a danger of the unit 12 impacting and damaging the track (and itself) despite the presence of the skids 13, 14. Under the former circumstances retraction is effected at low speed; under the latter circumstances retraction is effected at high speed.

Connecting the skids 13, 14 to the vehicle body on the same side of the unit 12 are two bars 67 which are gimballed at their ends but are of a constant, but preferably adjustable, length. In a lateral sense, therefore, the skids can be considered as fixed to the vehicle body.

At each end of the unit 12 a double-acting hydraulic ram 73 extends horizontally along and above the cross shaft 21 and connects the respective skid 13 or 14 to the rectangular structure carrying the stator 11.

In operation these rams 73 operate in unison or differentially to maintain the stator 11 in alignment with, and centrally above, the rotor 10 despite lateral or yawing movements of the vehicle body relative to the track; in combination with the rams 29, 108 they therefore maintain the stator along its length at substantially the desired transverse position relative to the rotor 10 despite the considerable translational and rotational movements of the vehicle body which are possible by virture of suspension systems which are provided between the vehicle body and the support pads 8 and guide pads 5.

In passing it will be noted that by virtue of the gimballed joints provided at the ends of the drop arms 15, 16 and the tie bars 67, the controlled movements of the unit 12 in the vertical and lateral senses are substantially decoupled from one another.

The mechanical arrangement for implementing the lateral and vertical position control of the stator 11 has now been described, as has also the effect of the control on the unit 12. How the control is achieved will now become apparent from the following description given with reference to FIGS. 5 to 7.

Referring now to FIG. 5 in particular, hydraulic fluid is drawn from a tank 163 by a boost pump 165 and a main pump 164 driven by the same shaft, and is fed from the main pump via a non-return valve 172 on to a high pressure line 161 having an associated main accumulator 166. A relief valve 160 prevents the pressure of the line 161 from exceeding a predetermined high value.

When the system is first started up the boost pump 165 pumps fluid to the main pump 164 via a filter 130. Valve 169, manually operated, returns the output of main pump 164 to tank until the main pump is running at speed and then the valve is closed. Pressure relief valve 170 prevents excessive pressure build-up between the boost and main pumps should, for example, the main pump fail or be inoperative. Devices 168 and 171 are pressure sensitive devices which are effective to shut down the system should the pressures they measure fall outside predetermined limits; they may also be used for indication.

During normal servo-control of the position of the stator 11, as is later to be described, high pressure fluid passes unrestrictedly from the line 161 on to a main pressure line 178 via a filter 173, a valve 175 and line 176. However, when the system is required to operate in its start and end-of-cycle modes, i.e., when stator 11 is required to move at leisure between its operating position close to rotor 10 and is retracted position (in which it is held by the latches 262), the valve 175 is opened i.e., moved to the right hand position illustrated, so that all fluid passing to the line 178 flows through restrictor 174. This ensures that movement of the stator is relatively slow and avoids the possibility of it over-shooting and causing damage.

A pressure sensitive device 177 indicates whether the pressure in main line 178 is at its high value (indicating that line 176 is in circuit) or at its low value (indicating that it is not). The device 177 can also, of course, serve to give an indication of various kinds of failure of the system and be used to initiate shut-down procedures. Item 179 is a temperature/flow meter.

Main pressure line 178 leads by way of a regular 180 and non-return valve 181 to accumulator 182, to which is linked a further pressure sensitive device 183. This device operates a warning light (not shown) when recording a pressure below a predetermined minimum. Relief valve 184 returns fluid direct to tank 163 when the pressure exceeds a predetermined maximum. A bleed valve 185 allows fluid to leak to tank 163 to relieve the fluid pressure on the off-loading rams 29 when the system is shut down subsequent to a period of operation.

From the non-return valve 181 fluid passes in parallel to a port 195 of each of the four off-loading rams 29 (only one of which is shown in FIG. 5 for clarity), to a port 141 of each of four bias actuators 87 later to be described, and, via line 186, to an emergency valve 188. The valve 188 is also connected, via a line 189, to the other port 196 of each of the off-loading rams.

In its normal or non-emergency position as shown the valve 188 connects the lines 186 and 189 so that there is equal fluid pressure at both sides of the pistons 190 of the off-loading rams. The surface areas on which fluid pressure acts at the two sides of each piston 190 differ by the area of the associated operating rod 28, so that the piston is subject to a resultant force in a sense (i.e., to the right as shown) to raise the stator 11. These forces on the pistons 190, regulated by the regulator 180, are set at such a value that the off-loading rams produce on the drop links 15, 16 upward forces which in total equal a suitably chosen mean value of the load to be imposed on the links by the stator unit 12. (It will be appreciated that this load will be made up of the constant weight of the unit 12 together with the varying upward or downward force electromagnetically produced by the stator 11.)

Each bias actuator 87 comprises a piston 191 on a through shaft 192, and has a further port 193 on the other side of the piston 191 from the port 141 connected to line 189. Normally there will be equal pressures on the two faces of the pistons 191, and because those faces are of equal area the actuator will normally be in balance and will exert no axial force on the shaft 192.

Each of the four control rams 108 has its ports 197 and 198 connected to a respective servo valve 140 which is conveniently a pilot-operated spool valve mounted on the ram, and by means of which the ports can either be shut off (as shown) or selectively connected one to the main pressure line 178 and the other to tank 163 via a return line 196 including a cooler 199. The servo valves 140 control the supply of fluid to their respective rams 108 and hence for forces exerted thereby, in a stepless manner between limiting positions; in response to signals passed along respective lines 98 from a computation circuit now to be described with reference to FIG. 6.

Referring now to FIG. 6, the computation circuit, indicated generally at 114, is connected for receiving as inputs four height signals $H_1$, $H_2$, $H_3$, $H_4$, which are respectively derived by suitable height sensors 121 to 124 located at convenient points near the four corners of the stator unit 12 and which accordingly are individually representative of the spacing of the unit 12 from the track at the location of the respective height sensors. The two height sensors 121, 124 on the front of the unit 12 can be seen diagrammatically in FIGS. 3 and 4.

In the circuit 114 the height signals are compared with reference signals ($H_{1R}$, $H_{2R}$, etc.) representative of their desired values, and error signals ($h_1$, $h_2$ etc.) are derived. Using these error signals the mean errors in the vertical spacing of the unit 12 from the track 2 which exists at each drop link 15, 16 due to heave, pitch and roll (vertical component) are separately computed in respective subcircuits 125, 126, and 127, and error-proportional output signals are accordingly passed on to lines 115, 116 and 117.

If the relative horizontal spacings of the drop links 15, 16 and the height sensors 121 to 124 are as indicated in FIG. 7, then the mean errors $Z_h$ (heave), $Z_p$ (pitch) and $Z_r$ (roll) are given by the following equations:

$$Z_h = h_1 + h_2 + h_3 + h_4/4$$
$$Z_p = x/4L\left[(h_1 + h_4) \sim (h_2 + h_3)\right]$$
$$Z_r = b/4y\left[(h_1 + h_2) \sim (h_3 + h_4)\right]$$

The three error signals are recombined electrically in a further circuit 109 (FIG. 6) to give, for each control ram 108, a respective output signal indicative of the ram movement required to remove the total calculated mean error at the locality of its associated drop link 15 or 16. These signals are passed on lines 98 to the servo valves 140, which accordingly control their associated rams 108 in a stepless manner to move their drop links 15, 16 in the appropriate direction and with the appropriate magnitude.

The separate computation of $Z_h$, $Z_p$, $Z_r$ enables different gains and compensating techniques to be used (in the subcircuits 125 to 127) for the vehicle movements involved; for example, the system may be given a faster response in heave than in roll.

During normal operation (as described above) the bias actuators 87 remain in balance and so have no effect upon the controlling movements of the servo valves 140. There are, however, several faults to which the vehicle is subject which render it necessary quickly to retract the stator unit 12 to its locked position in the latches 262 if probably harmful contact between the stator (at the skids 13, 14) and the rotor 10 is to be avoided. The vehicle can then come to rest on its air cushions or, more likely, on skids (not shown) mounted on the pads 5, 8 and, at slow speeds, the wheels 9.

When such a fault is sensed an explosive device 187 is automatically operated to cause the valve 188 quickly to connect the ports 193 of the bias actuators 87 and the ports 196 of the off load rams 29 to tank 163 by way of a restrictor 202 and line 201.

This venting of the left had side (as shown) of each bias actuator 87 destroys the force balance which had hitherto existed, with the result that the bias actuators operate to move the valves 140 quickly, overriding their normal servo control, to positions in which they connect the ports 198 of the control rams 108 to tank 163 via line 196, and their ports 197 to the main supply line 178. Each off-loading ram 29 and each control ram 108 thus acts in unison to raise the stator unit 12 until it is engaged and held out of harm's way by the latches 262. Because the fluid pressure in the high pressure input line 178 is at its high value — the restrictor 174 is shortcircuited by the line 176 — and the valve 188 is fast operating, the response is fast; typically the total time between sensing of the fault and the completion of stator unit retraction is one tenth of a second.

The previously mentioned slow retraction of the unit 12 into the latches 262 for stowage, maintenance etc. does not involve the valve 188 but is effected by generating on the lines 98 special electrical signals of a suitable magnitude and appropriate sense; these signals override the signals provided on the lines 98 for the purposes of the closed loop control described above.

In a similar way (i.e., by generating special signals on the lines 98) the unit 12 may be automatically or manually retracted into the latches 262 in the event of a fault which is not of sufficient severity to warrant the operation of the device 187 but which nevertheless makes retraction of the unit 12 desirable. However, for this operation the line 178 remains unrestricted by the restrictor 174.

The control of the lateral position of the stator unit 12 by the two rams 73 is effected by the control circuit shown in FIG. 8 in which the six blocks 113 represent distance transducers which are conveniently individually connected across the suspension between the guidance gas cushion pads 5 and the vehicle body.

The tranducers 113 generate signals ($L_1$, $L_2$ etc.) proportional to the spacing of the pads 5 from the vehicle body, and these signals are compared with reference signals ($L_{1R}$, $L_{2R}$ etc.) indicative of their required values and the resultant error signals ($l_1$, $l_2$ etc.) are passed to each of three subcircuits 144, 145 and 146 of a computation circuit generally indicated by the reference numeral 143. In an analogous manner to the operation of the subcircuits 125, 126 and 127 of FIG. 6, the subcircuits 144 to 146 generate signals proportional to the mean errors $Z_s$, $Z_y$ and $Z_x$ in (respectively) sideslip, yaw, and roll (horizontal component) at the rams 73; these signals are passed via lines 147, 148 and 149 to a further subcircuit 150 equivalent to the subcircuit 109 of FIG. 6.

In response to the signals on the lines 147, 148 and 149 the subcircuit 150 generates on two lines 151 signals individually indicative of the movement required of the lateral control rams 73 to remove the lateral position error. For each ram 73 the signal on the respective line 151 is compared in a comparator 155 with a signal derived from a distance transducer 83 mounted in parallel with the ram, and the resultant difference signal is passed on to a further line 152.

Each lateral control ram 73 has a servo valve 77 associated with it conveniently as in the case of the valves 140, the valves 77 being pilot-operated spool valves mounted on the cylinder of their respective rams, as indicated in FIG. 3. The signals on the lines 152 are passed to the appropriate valves 77 which accordingly control their rams 73 in a stepless manner and in a sense to reduce the lateral position error of the stator unit 12 at their locality.

As so far described the position of the stator unit 12 with respect to the vehicle body is controlled in the lateral and vertical senses. In the longitudinal sense, i.e., so as to transmit to the vehicle body the tractive forces produced by the stator 11 in operation, the unit is connected to the vehicle body by a thrust bar assembly disposed at the front of the unit and now to be described with reference to FIGS. 3 and 4.

The thrust bar assembly comprises two thrust bars 101 which at one end are connected by a universal joint to the vehicle body and at their other ends are likewise connected by a further universal joint to a respective crank 102. The cranks are mounted at 104 for rotation about vertical axes, the pivotal mountings for the cranks being carried by a yoke 105 forming a structural part of the stator 11 and secured to the bearers 19.

The arms of the cranks 102 not connected to the thrust bars 101 are connected to one another by a rigid link 106 pivotally mounted at its ends.

In operation, by compression of the thrust bars 101 thrust bar assembly transmits to the vehicle body the tractive forces produced by the stator 11; if the stator is arranged to provide regenerative braking, the regenerative braking forces are likewise transmitted to the vehicle body by the assembly, but by tension in the thrust bars.

When the vehicle body and the unit 12 are aligned with one another and with the track, the thrust bar linkage comprising the items 101, 102 and 106 is, as shown in FIG. 4, symmetrical about the vertical central plane of the unit 12 and the forces in the thrust bars 101 are equal. Should, however, the vehicle yaw relative to the track so that the rams 73 are differentially operated by the closed loop control previously mentioned to maintain the stator 11 substantially aligned with the underlying rotor 10, then a yaw angle will exist between the stator and the vehicle body. in the thrust bar linkage this yaw angle is accommodated by rotation of the cranks 102 in the same sense so as to maintain substantially equal the compressive forces in the thrust bars 101; in the connections between stator 11 and vehicle body comprising the items 21 and 67 the yaw angle is accomodated by swinging of the tie bars 67 and drop links 15, 16.

Although the invention has been described in relation to the attachment of a linear induction motor stator to the body of a vehicle arranged for operation along a prepared track, it is in no way limited to such an application. The structure formed in the described embodiment by the stator may in other arrangements be constituted by, for example, a bogie providing support and/or guidance for a vehicle operating along a prepared track, by suitable co-operation with the track (as by cushion or wheels).

We claim:

1. A vehicle for operation along a prepared track the vehicle having a body and an associated structure for co-operation with the track and at least one pair of actuators connected operatively in parallel between the vehicle body and the said structure, means for energising a first of said actuators to produce a substantially constant force between the said structure and the vehicle body, the said force being equal to a selected mean value of a variable force required to be transmitted between the vehicle body and the said structure during operation of the vehicle, and means for selectively energising a second of said actuators to produce, during operation of the vehicle, a controllable force substantially equal to the difference between the said constant force and the actual value of the said variable force.

2. A vehicle as claimed in claim 1 in which the actuators are connected at one end to a first arm of a crank pivotally mounted on a vehicle body, a second arm of the crank and the other ends of the actuators being connected, one to the said structure and the other to the vehicle body.

3. A vehicle as claimed in claim 1 in which the actuators comprise double acting hydraulic rams, both sides of one ram comprising the first actuators being supplied with hydraulic fluid at substantially the same pressure to produce the said constant force, the supply of hydraulic fluid to one or the other side of the other ram being controlled via a servo valve in response to signals indicating the sense and magnitude of the controllable force required.

4. A vehicle for operation along a prepared track and adapted to be propelled by a linear induction motor comprising a stator carried by the vehicle for co-operation with the reaction rail extending along the track in which means are provided for maintaining the said stator, during operation of the vehicle, in a substantially constant spaced relationship with the said reaction rail, said means comprising at least one pair of double acting hydraulic rams arranged to act in parallel between the vehicle and the stator structure, one of said rams in operation being arranged to exert a substantially constant force upon the stator and the other of said rams being selectively controllable so as to act with or in opposition to the said first ram to counteract perturbing forces tending to move the stator structure in a sense to vary the said spaced relationship between it and the reaction rail.

5. A vehicle as claimed in claim 4 in which four such pairs of hydraulic rams are provided, means being provided independently selectively to control the controllable one of each of the said pairs of rams.

6. A vehicle as claimed in 5 in which the said control means comprise means responsive to movements of the stator relative to the reaction rail in senses resulting in heave, pitch and roll of the stator relative to the reaction rail and to produce signals proportional to deviations of the stator from its desired spaced relationship with the reaction rail, and servo valves operative in dependence upon the said signals to control the said controllable rams.

7. A vehicle as claimed in 4 in which at least one further hydraulic ram is provided acting between the stator and the vehicle to control the lateral disposition of the stator relative to the vehicle.

8. A vehicle as claimed in 4 in which means are provided operative in an emergency to vent one side of each ram while maintaining a supply of hydraulic fluid to the other sides so that the rams act in unison to retract the stator.

9. In a vehicle for operation along a prepared track the vehicle carrying the stator of a linear induction motor for co-operation with a reaction rail extending along the track to propel the vehicle, the stator being mounted for movement relative to the vehicle in a direction towards and away from the reaction rail, the provision of at least two pairs of double acting hydraulic rams, means operatively connecting the rams in parallel between the vehicle and the stator structure, means for supplying hydraulic to both sides of a first ram of each of the said pairs of rams to occasion the said ram to exert a substantially constant force on the stator, the force being equal to a chosen mean value of the load imposed on the said ram by the weight of the stator and varying upward or downward forces electromagnetically produced by the stator in operation and servo valve means operative to control the supply of hydraulic fluid selectively to one or the other side of a second ram of each of the said pairs of rams so as to exert a controllable force on the stator, means for sensing the position of the stator in relation to the reaction rail, and means for deriving signals proportional to deviations of the stator from a predetermined spaced relationship with respect to the reaction rail operative to control the servo valve means to occasion operation of said second rams of each of said pairs of rams to maintain the stator in said predetermined spaced relationship.

* * * * *